(12) United States Patent
Fisher et al.

(10) Patent No.: US 8,071,503 B2
(45) Date of Patent: Dec. 6, 2011

(54) CATALYST

(75) Inventors: Janet Mary Fisher, Reading (GB);
David Thompsett, Reading (GB)

(73) Assignee: Johnson Matthey Public Limited Company, London (GB)

( * ) Notice: Subject to any disclaimer, the term of this patent is extended or adjusted under 35 U.S.C. 154(b) by 0 days.

(21) Appl. No.: 12/375,107

(22) PCT Filed: Jul. 20, 2007

(86) PCT No.: PCT/GB2007/050427
§ 371 (c)(1),
(2), (4) Date: Nov. 2, 2009

(87) PCT Pub. No.: WO2008/012572
PCT Pub. Date: Jan. 31, 2008

(65) Prior Publication Data
US 2010/0086831 A1    Apr. 8, 2010

(30) Foreign Application Priority Data

Jul. 27, 2006    (GB) .................................. 0614909.0

(51) Int. Cl.
| | |
|---|---|
| *B01J 23/00* | (2006.01) |
| *B01J 21/18* | (2006.01) |
| *B01J 23/40* | (2006.01) |
| *B01J 23/74* | (2006.01) |
| *B01J 23/42* | (2006.01) |
| *B01J 23/44* | (2006.01) |
| *H01M 4/88* | (2006.01) |
| *H01M 4/36* | (2006.01) |
| *H01M 8/10* | (2006.01) |
| *H01M 4/92* | (2006.01) |
| *H01M 4/02* | (2006.01) |
| *H01M 4/94* | (2006.01) |
| *H01M 4/90* | (2006.01) |
| *C22C 5/04* | (2006.01) |
| *C25B 11/00* | (2006.01) |

(52) U.S. Cl. ......... 502/325; 502/101; 502/185; 502/339; 420/462; 420/463; 420/465; 420/466; 429/484; 429/487; 429/523; 429/525; 429/526; 204/293; 204/284

(58) Field of Classification Search .................. 502/101, 502/185, 325, 339; 420/462, 463, 466, 465; 429/484, 487, 523, 525, 526; 204/293, 286, 204/284
See application file for complete search history.

(56) References Cited

U.S. PATENT DOCUMENTS 3,055,840 A * 9/1962 Koch, Jr ........................ 502/174
(Continued)

FOREIGN PATENT DOCUMENTS

EP    0 731 520 B1    5/2001
(Continued)

OTHER PUBLICATIONS

V. G. Dobrokhotov et al., "Adsorption of $C_6$ Aliphatic Hydrocarbons on Pd-Ru Alloy," *Russian Chemical Bulletin*, vol. 32, No. 7, Jul. 1983, pp. 1342-1345.

*Primary Examiner* — Patricia L Hailey
(74) *Attorney, Agent, or Firm* — RatnerPrestia

(57) ABSTRACT

An electrocatalyst, suitable for use in a fuel cell, comprises an alloy having a single crystalline phase, wherein the alloy consists of 5-95 at % palladium, 5-95 at % ruthenium and less than 10 at % of other metals, provided that the alloy does not consist of 50 at % palladium and 50 at % ruthenium.

16 Claims, 2 Drawing Sheets

U.S. PATENT DOCUMENTS

| | | | |
|---|---|---|---|
| 4,460,660 A | | 7/1984 | Kujas |
| 4,489,039 A | * | 12/1984 | Roshan et al. ............... 420/463 |
| 4,952,549 A | * | 8/1990 | Immel et al. ................. 502/330 |
| 5,208,207 A | | 5/1993 | Stonehart et al. |
| 5,696,293 A | * | 12/1997 | Phillips et al. ............... 564/480 |
| 5,716,437 A | * | 2/1998 | Denton et al. ............. 106/31.92 |
| 6,498,121 B1 | * | 12/2002 | Gorer ........................... 502/325 |
| 6,649,300 B2 | * | 11/2003 | Ito et al. ....................... 429/487 |
| 6,682,837 B2 | * | 1/2004 | Gorer ........................... 429/422 |
| 6,995,114 B2 | | 2/2006 | Gorer |
| 7,153,802 B2 | * | 12/2006 | Manco et al. ................ 502/101 |
| 7,419,740 B2 | * | 9/2008 | Binder et al. ................ 429/479 |
| 7,713,910 B2 | * | 5/2010 | Goia et al. ................... 502/326 |
| 2003/0073575 A1 | * | 4/2003 | Gorer ........................... 502/339 |
| 2006/0068987 A1 | * | 3/2006 | Bollepalli et al. ............ 502/182 |
| 2006/0264319 A1 | * | 11/2006 | Yoo et al. ..................... 502/101 |
| 2007/0026292 A1 | | 2/2007 | Adzic et al. |
| 2007/0184332 A1 | * | 8/2007 | Park et al. ...................... 429/40 |
| 2008/0292943 A1 | * | 11/2008 | Fongalland et al. ............ 429/41 |
| 2009/0075139 A1 | * | 3/2009 | Kucernak et al. ............... 429/30 |

FOREIGN PATENT DOCUMENTS

| | | |
|---|---|---|
| FR | 1407903 | 8/1965 |
| GB | 2 018 252 A | 10/1979 |
| GB | 1 578 913 | 11/1980 |
| GB | 2 096 595 A | 10/1982 |
| GB | 2 112 414 A | 7/1983 |
| GB | 2 187 756 A | 9/1987 |
| GB | 2 187 758 A | 9/1987 |
| GB | 2 187 759 A | 9/1987 |
| KR | 10-0671427 * | 1/2007 |
| WO | WO-91/19566 | 12/1991 |

* cited by examiner

CATALYST

CROSS-REFERENCE TO RELATED APPLICATIONS

This application is the U.S. National Phase application of PCT International Application No. PCT/GB2007/050427, filed Jul. 20, 2007, and claims priority of British Patent Application No. 0614909.0, filed Jul. 27, 2006, both of which are incorporated herein by reference.

FIELD OF THE INVENTION

The present invention relates to a catalyst suitable for use in a fuel cell, particularly a direct methanol fuel cell.

BACKGROUND OF THE INVENTION

A fuel cell is an electrochemical cell comprising two electrodes separated by an electrolyte. A fuel, e.g. hydrogen or methanol, is supplied to the anode and an oxidant, e.g. oxygen or air, is supplied to the cathode. Electrochemical reactions occur at the electrodes, and the chemical energy of the fuel and the oxidant is converted to electrical energy and heat. Electro catalysts are used to promote the electrochemical oxidation of the fuel at the anode and the electrochemical reduction of oxygen at the cathode.

In proton exchange membrane (PEM) fuel cells, the electrolyte is a solid polymeric membrane. The membrane is electronically insulating but ionically conducting. Proton-conducting membranes are typically used, and protons, produced at the anode, are transported across the membrane to the cathode, where they combine with oxygen to create water.

The principle component of a PEM fuel cell is known as a membrane electrode assembly (MEA) and is essentially composed of five layers. The central layer is the polymeric membrane. On either side of the membrane there is an electrocatalyst layer, containing an electrocatalyst, which is tailored for the different requirements at the anode and the cathode. Finally, adjacent to each electrocatalyst layer there is a gas diffusion layer. The gas diffusion layer must allow the reactants to reach the electrocatalyst layer, must allow products to be removed from the electrocatalyst layer, and must conduct the electric current that is generated by the electrochemical reactions. Therefore the gas diffusion layer must be porous and electrically conducting.

Direct methanol fuel cells are a promising alternative power source for portable power applications and electronic devices such as mobile telephones and laptop computers. Methanol is a readily available fuel that is easy to store and transport and has a high energy density. Methanol or a mixture of methanol and water is supplied to the anode, and an oxidant, usually air or oxygen, is supplied to the cathode. The anode and cathode reactions are shown in the following equations:

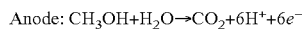

Anode: $CH_3OH+H_2O \rightarrow CO_2+6H^++6e^-$

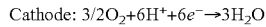

Cathode: $3/2O_2+6H^++6e^- \rightarrow 3H_2O$

The state-of-the-art anode electrocatalyst is a platinum-ruthenium alloy, which may or may not be supported on a conducting support material such as carbon particles. Platinum is an expensive metal and the present inventors have sought to provide an anode electrocatalyst that has useful activity in direct methanol fuel cells, but uses less or no platinum and is therefore less costly to produce. The present inventors have developed palladium-ruthenium alloy catalysts that have surprisingly high activity in direct methanol fuel cells.

U.S. Pat. No. 6,995,114 discloses platinum-ruthenium-palladium catalysts that are useful in direct methanol fuel cells and U.S. Pat. No. 5,208,207 discloses platinum-ruthenium-palladium catalysts that are useful in fuel cells wherein the fuel is reformats. The disclosed ranges specify that the catalysts must contain at least 10% platinum (expressed as atomic percentage) and all the examples contain at least 20% platinum. The present inventors have found that a palladium-ruthenium alloy catalyst (containing no platinum or less than 10% platinum) has useful activity as an anode electrocatalyst in a direct methanol fuel cell. By contrast, a palladium-only catalyst and a ruthenium-only catalyst do not have useful catalytic activity. U.S. Pat. No. 6,995,114 contains a comparative example (electrode 13) which is said to represent a 50:50 Pd:Ru alloy. This electrode exhibits no activity for the electrochemical oxidation of methanol, so the present inventors assume that this catalyst is not a palladium-ruthenium alloy, but an inactive mixture of palladium and ruthenium.

SUMMARY OF THE INVENTION

The present invention provides an electro catalyst comprising an alloy having a single crystalline phase, wherein the alloy consists of 5-95 at % palladium, 5-95 at % ruthenium and less than 10 at % of other metals, provided that the alloy does not consist of 50 at % palladium and 50 at % ruthenium. (NB "at %" means atomic percentage, i.e. the percentage based on atoms or moles of the metals).

BRIEF DESCRIPTION OF THE DRAWINGS

In order that the invention may be more fully understood, the description will be described with reference to the accompanying drawings, in which.

DETAILED DESCRIPTION OF THE INVENTION

Figure 1:
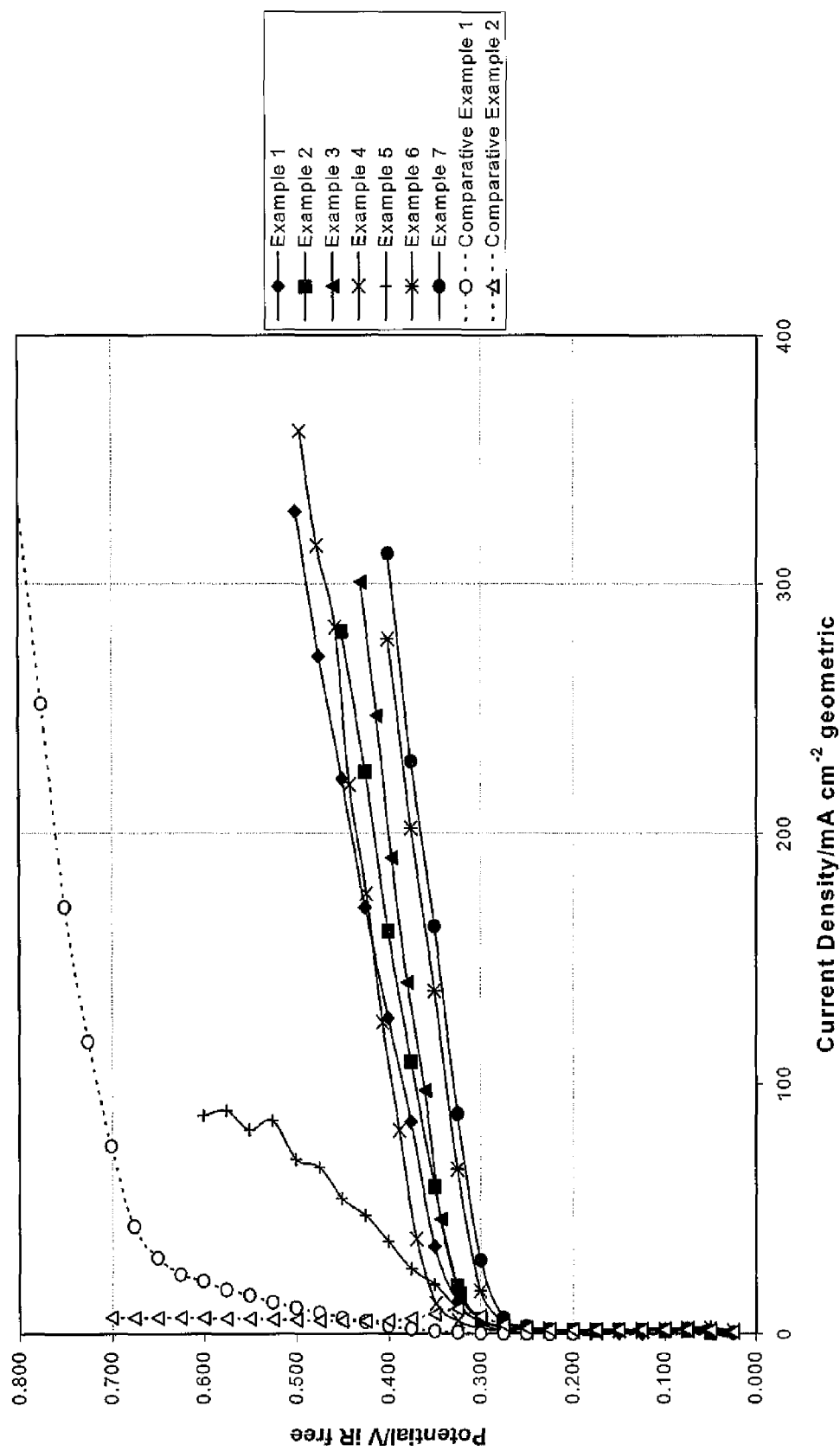
FIG. 1 shows the performance of membrane electrode assemblies containing electrocatalysts according to embodiments of the invention and comparative examples 1 and 2 at 80° C.

The alloy has a single crystalline phase, which can be detected by x-ray diffraction. The single crystalline phase is indicative of a true alloy, rather than a mixture of metals.

In a first embodiment of the invention, the amount of palladium in the alloy is at least 5 at %, suitably at least 10 at %, preferably at least 20 at %, more preferably at least 30 at %. The amount of ruthenium in the alloy is at least 5 at %, suitably at least 10 at %, preferably at least 20 at %, most preferably at least 30 at %. The amount of other metals in the alloy is less than 10 at %, preferably less than 8 at %, most preferably less than 5 at %. In one embodiment of the invention, the alloy consists of palladium and ruthenium and the amount of other metals is 0 at %.

In a second embodiment of the invention, the amount of palladium in the alloy is from 5 to 49 at %, suitably 10 to 49 at %, more suitably 20 to 49 at %, the amount of ruthenium in the alloy is from 51 to 95 at %, suitably 51 to 90 at %, more suitably 51 to 80 at %, and the amount of other metals is up to 10 at %, suitably up to 5 at %.

Suitably, if the amount of palladium in the alloy is less than 30 at %, then the amount of other metals is greater than 0 at %.

The term "other metals" encompasses any metals other than palladium and ruthenium that may be incorporated into the alloy. In one embodiment of the invention, the other metals in the alloy comprise or consist of platinum. The electro catalysts of the invention therefore include PdRuPt alloy catalysts, but these are unlike PdRuPt alloy catalysts according to the prior art because the amount of Pt in the catalysts according to the invention must be less than 10 at %.

The electrocatalyst comprises the alloy, and may consist of the alloy. In an alternative embodiment, the electro catalyst comprises the alloy supported on a high surface area support material and may consist of the alloy supported on the high surface area support material. A preferred high surface area support material is carbon, e.g. carbon black. Suitable carbons include furnace blacks, extra-conductive blacks, acetylene blacks and graphitised versions thereof. Exemplary carbons include Ketjen EC300J, Vulcan XC72R and Denka Black.

If the electrocatalyst is supported on a high surface area support material, the loading of the alloy is suitably greater than 10 weight % (based upon the weight of the support material), preferably greater than 30 weight % and most preferably greater than 50 weight %.

The present invention further provides a method for preparing an electrocatalyst according to the invention comprising the steps of:
(a) preparing a solution comprising a palladium salt, a ruthenium salt and optionally salts of other metals;
(b) co-precipitating the metals, optionally in the presence of a high-surface area support material, by adjusting the pH;
(c) filtering;
(d) drying; and
(e) firing in a reducing atmosphere.

Suitable palladium and ruthenium salts include ruthenium chloride and palladium nitrate. If platinum is to be incorporated in the alloy, a suitable salt is hexachloroplatinic acid. To prepare a supported electrocatalyst, the support material such as carbon black is present in step (b). In one method of preparing an unsupported electrocatalyst, a support material such as calcium carbonate is present in step (b) and then is subsequently removed by leaching in acid such as nitric acid. A suitable reducing atmosphere is a gaseous mixture of 5% hydrogen in nitrogen and suitable firing conditions are 30 minutes at 200° C. The firing step promotes alloying of the metals.

The present invention provides a catalyst ink comprising an electro catalyst according to the invention dispersed in a solvent. The catalyst ink suitably further comprises proton-conducting polymer such as a perfluorinated sulphonic acid polymer. The catalyst ink is suitably used to prepare electro-catalyst layers for use in fuel cells.

The present invention further provides a catalysed gas diffusion electrode comprising a gas diffusion material and an electrocatalyst layer deposited on the gas diffusion material, wherein the electrocatalyst layer comprises an electrocatalyst according to the invention. The present invention further provides a catalysed membrane comprising a proton exchange membrane and an electrocatalyst layer deposited on the membrane, wherein the electro catalyst layer comprises an electro catalyst according to the invention. The present invention further provides a membrane electrode assembly comprising an electrocatalyst according to the invention. The present invention further provides a fuel cell, especially a direct methanol fuel cell, wherein the anode comprises an electrocatalyst according to the invention. Methods of preparing catalysed gas diffusion electrodes, catalysed membranes and membrane electrode assemblies and methods of assembling fuel cells are within the competence of the person skilled in the art.

The present invention further provides a method of operating a direct methanol fuel cell according to the invention, comprising steps of
(a) supplying methanol and optionally water to the anode; and
(b) supplying air or oxygen to the cathode.

EXAMPLES

The invention will now be described by reference to examples, which are intended to be illustrative and not limiting of the invention.

Example 1

PdRu Alloy Catalyst

Carbon black (Ketjen EC300J, 5 g) was mixed with water (250 ml) using a silverson mixer (5 mins, 6000 rpm). The mixture thickened considerably and was transferred to a 1L beaker and diluted to 400 ml with water. The carbon slurry was stirred and warmed to 50° C. and the pH was adjusted to about 9.0 with NaOH (1M). $RuCl_3$ (6.33 g, 0.0247 mol, 39.46% Ru, ~2.5 gRu) was weighed into a beaker and Pd nitrate (17.12 g, 0.0235 mol, 14.16% Pd, ~2.5 gPd) was added, the mixture was diluted to about 200 ml with water and thoroughly stirred. This solution was pumped into the carbon slurry at about 10 ml/min and NaOH (1M) was fed in at variable rate via pH control unit to maintain the pH at 7.5. When the salt addition was complete the slurry was stirred at 50° C. for a further 30 mins. The catalyst was then recovered by filtration and washed on the filter bed until the conductivity was less than 130 mS. The catalyst was dried at ambient temperature in a vacuum oven and then for 1 h at 105° C. The yield was 13.68 g.

A portion of the catalyst (1.0 g) was heat treated in 5% $H_2/N_2$ for 30 min at 200° C. (ramp up 5° C./min). The yield was 0.75 g. X-ray diffraction profile analysis confirmed the presence of a single palladium ruthenium alloy. The PdRu crystallite size was 3.1 nm and the lattice parameter was 3.85 Å. The weight % loading of metal on the catalyst is: Pd 25%, Ru 25% (atomic %: 47.9% Pd, 52.1% Ru).

Example 2

PdRuPt Alloy Catalyst

Carbon black (Ketjen EC300J, 2.25 g) was dispersed in water (250 ml) using a Silverson mixer (5000 rpm, 10 mins). The slurry was transferred to a 1L beaker fitted with overhead stirrer, pH and temperature probes and 2 feed inlet tubes connected to pH control unit. The slurry was stirred at ambient temperature and the volume was made up to 300 ml with water. $RuCl_3$ (3.17 g, 39.46% Ru, 1.25 g Ru, 0.0123 mol) was dissolved in water ca. 40 ml and Pd nitrate (15.66 g, 7.98% Pd, 1.25 g Pd, 0.0117 mol) and Pt nitrate (1.52 g, 16.41% Pt, 0.25 g Pt, 1.28 mmol) were added. The volume was made up to 100 ml with water and this solution was added at ca. 10 ml/min to the carbon slurry together with NaOH (1M) at variable rate to maintain the pH at 7.0. After the addition was complete the slurry was stirred for 3.5 hours (pH=6.8) and then filtered. The catalyst was washed on the filter bed until the conductivity was less than 20 μS. The catalyst was dried overnight at 105° C. to give a yield of 5.91 g.

A portion (3.09 g) of the dried material was fired at 200° C. in 5% $H_2/N_2$ (ramp up 5° C./min) for 30 minutes. The yield was 2.62 g. The weight % loading of the metal on the catalyst is as follows: Ru 23.5%, Pd 23.5% and Pt 4.5% (atomic %: 46.3% Pd, 48.9% Ru, 4.8% Pt).

Example 3

PdRuPt Alloy Catalyst

Carbon black (Ketjen EC300J, 2.25 g) was dispersed in water (250 ml) using a Silverson mixer (5000 rpm, 10 mins). The slurry was transferred to a 1L beaker fitted with overhead stirrer, pH and temperature probes and 2 feed inlet tubes connected to pH control unit. The slurry was stirred at ambient temperature and the volume was made up to 300 ml with water. $RuCl_3$ (3.17 g, 39.46% Ru, 1.25 g Ru, 0.0123 mol) was dissolved in water ca. 40 ml and Pd nitrate (15.66 g, 7.98% Pd, 1.25 g Pd, 0.0117 mol) was added. The volume was made up to 100 ml with water and this solution was added at ca. 10 ml/min to the carbon slurry together with NaOH (1M) at variable rate to maintain the pH at 7.0. After the addition was complete, the slurry was stirred for 0.5 hours (pH=6.9). Pt nitrate (1.52 g, 16.41% Pt, 0.25 g Pt, 1.28 mmol) in water (10 ml) was added at ca. 10 ml/min together with NaOH (1M) to keep the pH at 7.0. The slurry was stirred for a further 0.5 hours and then filtered. The catalyst was washed on the filter bed until the conductivity was less than 40 μS. The catalyst was dried overnight at 105° C. to give a yield of 6.09 g.

A portion (3.0 g) of the dried material was fired at 200° C. in 5% $H_2/N_2$ (ramp up 5° C./min) for 30 minutes. The yield was 2.51 g. The weight % loading of the metal on the catalyst is as follows: Ru 23.4%, Pd 23.4% and Pt 4.6% (atomic %: 46.8% Pd, 48.9% Ru, 4.3% Pt).

Example 4

PdRu Alloy Catalyst

Carbon black (Ketjen EC300J, 2.5 g) was dispersed in water (150 ml) using a Silverson mixer (5000 rpm, 5 mins). The slurry was transferred to a 1L beaker fitted with pH and temperature probes and 2 feed inlet tubes connected to pH control unit. The slurry was diluted to 200 ml with water and stirred overhead. $RuCl_3$ (3.09 g, 40.47% Ru, 1.25 g Ru, 0.0124 mol) was dissolved in water ca. 30 ml and Pd nitrate (15.66 g, 7.98% Pd, 1.25 g Pd, 0.0117 mol) was added. The volume was made up to 100 ml with water. This salt solution was pumped into the carbon slurry at ca. 10 ml/min together with NaOH (1M) to maintain the pH at 7.0. The slurry was stirred for 1 hour after the addition was complete. The catalyst was recovered by filtration and washed on the filter bed until the conductivity was less than 20 μS. The catalyst was dried overnight at 105° C. to give a yield of 5.96 g.

A portion (2.0 g) of the dried material was fired at 250° C. in 5%$H_2/N_2$ (ramp up 5° C./min) for 30 minutes. The yield was 1.66 g. The weight % loading of the metal on the catalyst is as follows: Ru 21.1%, Pd 21.5% (atomic %: 48.8% Pd, 51.2% Ru).

Example 5

PdRu Alloy Catalyst

Carbon black (Ketjen EC300J, 5 g) was mixed with water (300 ml) using a Silverson mixer (5000 rpm, 5 mins). The mixture thickened considerably and was transferred to a 1L beaker and diluted to ca. 400 ml with water. The carbon slurry was overhead stirred. $RuCl_3$ (9.27 g, 40.27% Ru, 3.75 g Ru, 0.0371 mol) was weighed into a beaker and dissolved in a few mls water and Pd nitrate (15.66 g, 7.98% Pd, 1.25 g Pd, 0.0117 mol) was added, the mixture was diluted to ca. 200 ml with water and thoroughly stirred. This solution was pumped into the carbon slurry at ca. 10 ml/min and NaOH (1M) was fed in at variable rate via pH control unit to maintain the pH at 7.0. When the salt addition was complete the slurry was stirred at ambient for a further 1 hour. pH at the of stirring was 6.5. The catalyst was then recovered by filtration and washed on the filter bed until the conductivity was less than 32 μS. The catalyst was dried overnight at 105° C. to give a yield of 12.06 g.

A portion (4 g) of the dried material was fired at 200° C. in 5% $H_2/N_2$ (ramp up 5° C./min) for 30 minutes. The yield was 3.38 g. The weight % loading of the metal on the catalyst is as follows: Ru 31.8%, Pd 11.3% (atomic %: 26.2% Pd, 73.8% Ru).

Example 6

PdRuPt Alloy Catalyst

Carbon black (Ketjen EC300J, 2.25 g) was mixed with water (250 ml) using a Silverson mixer (5000 rpm, 10 mins). The slurry was transferred to a 1L beaker (rinsing with 50 ml water) and overhead stirred. The beaker was fitted with temperature and pH probes connected to pH control unit and two feed inlet tubes. $RuCl_3$ (4.75 g, 39.46% Ru, 1.875 g Ru) was dissolved in water (30 ml) and Pd nitrate (7.49 g, 8.34% Pd. 0.625 g Pd) solution was added and the volume made up to 100 ml with water. This solution was pumped into the carbon slurry at ca. 10 ml/min and NaOH (1M) was fed in at variable rate to maintain the pH at 7.0. When the addition was complete the slurry was stirred for 30 minutes and then Pt nitrate (1.52 g, 16.41% Pt, 0.25 g Pt) in water (5 ml) was added by pipette by hand to the slurry. NaOH was added bringing the final pH to 8.4. The slurry was stirred for 45 minutes. The catalyst was then recovered by filtration and washed on the filter bed until the conductivity was less than 40 μS. The catalyst was dried over a few days at 105° C. to give a yield of 6.29 g.

A portion (2 g) of the dried material was fired at 200° C. in 5% $H_2/N_2$ (ramp up 5° C./min) for 1 hour. The yield was 1.64 g. The weight % loading of the metal on the catalyst is as follows: Ru 33.9%, Pd 11.6%, Pt 4.7% (atomic %: 23.4% Pd, 72.3% Ru, 4.3% Pt).

Example 7

PdRuPt Alloy Catalyst

Ketjen EC300J (2.0 g) was dispersed in water (250 ml) using a Silverson mixer (5000 rpm, 10 mins). The slurry was transferred to a 1L beaker (rinsing with 50 ml water) and o/h stirred. The beaker was fitted with temperature and pH probes connected to pH control unit and 2 feed inlet tubes. $RuCl_3$ (4.75 g, 39.46% Ru) was dissolved in water (30 ml) and palladium nitrate (7.49 g, 8.34% Pd) solution was added and the volume made up to 100 ml. This solution was pumped into the carbon slurry at ca. 10 ml/min and NaOH was pumped in at variable rate to maintain the pH at 7.0. When the addition was complete the slurry was stirred for 30 mins and then Pt nitrate (1.52 g, 16.41% Pt,) was added by pipette by hand to the slurry. NaOH was added bringing the final pH to 8.0. The slurry was stirred for 45 mins. The catalyst was recovered by filtration and washed on the filter bed until the conductivity was less than 20 µS. The material was dried at 105° C. Yield=5.93 g.

A portion (2 g) of dried sample was fired at 200 C. in 5% $H_2/N_2$ for 1 h (ramp up 5 C./min). The sample was passivated after firing (4 C. exotherm). Yield=1.64 g. The weight % loading of the metal on the catalyst is as follows: Ru 34.5%, Pd 11.7%, Pt 9.1% (atomic %: 22.1% Pd, 68.4% Ru, 9.5% Pt).

Comparative Example 1

Pd Catalyst

Carbon black (Ketjen EC300J, 40 g) was slurried in water (2.5L) in two batches using a silverson mixer (10 mins, 4800 rpm). The slurry was diluted to 3.3L and the reaction beaker was fitted with temperature probe, pH probe and 2 feed inlets. Pd nitrate (70.62 g, 14.16% Pd, 10 g Pd) was diluted to 400 ml with water and pumped into the carbon slurry at about 10 ml/min. NaOH (1M) was pumped in at variable rate to maintain the pH at 6.9 using a pH control unit. The temperature did not exceed 22° C. during the preparation. The catalyst slurry was stirred at ambient for 90 mins. The sample was recovered by filtration. The catalyst and washings (5L) were returned to reaction beaker and reslurried. NaOH was added to adjust the pH to 8.0. The slurry was stirred for 20 min and then left overnight. The sample was collected by filtration and washed on the filter bed until the conductivity of the filtrate was less than 800 mS. The sample was oven dried at 105° C. overnight. The yield was 54.4 g.

A portion (10.5 g) of the unreduced catalyst was fired in 5% $H_2/N_2$ at 120° C. for 45 min (ramp up 4° C./min). The yield was 9.26 g. The loading of Pd was 20 wt % based upon the weight of the carbon black.

Comparative Example 2

Ru Catalyst

Carbon black (Ketjen EC300J, 3.75 g) was slurried in water (300 ml) using a silverson mixer (5 mins, 5000 rpm). $RuCl_3$ (3.17 g, 39.46% Ru, 1.25 gRu, 12.3 mmol) was dissolved in water (100 ml) and pumped into the stirred carbon slurry at about 10 ml/min. As soon as the pH dropped to 3.0, NaOH (0.5M) was added at variable rate to maintain the pH at 3.0 via pH control unit. At the end of the addition the slurry was stirred for a further 1 h, the pH dropped slowly and small increments of base were added at intervals to maintain the pH at 3.0. At the end of 1 h the catalyst was filtered but the filtrate was coloured indicating Ru present. The filtrate and catalyst were returned to the reaction beaker. The slurry was warmed to 45° C. and the pH was adjusted back to 3.0. After about 1 h the catalyst was refiltered. The catalyst was washed on the filter bed until the conductivity was less than 200 µS and was then reslurried in water and allowed to settle overnight. Solid ammonium bicarbonate (about 2 g) was added and the catalyst was filtered and washed on the filter bed with 1L water. The sample was oven dried at 105° C. The yield was 5.73 g.

A portion of the catalyst (3 g) was fired in 5% $H_2/N_2$ at 200° C. for 30 min. The yield was 2.79 g. The loading of Ru was 25 wt % based upon the weight of the carbon black.

Comparative Example 3

PtRu Alloy Catalyst

A commercially available PtRu catalyst (HiSpec® 12100 from Johnson Matthey) was obtained. The loading of Pt was 50 wt % and the loading of Ru was 25 wt % based upon the weight of the carbon black.

A summary of all the examples is given in Table 1.

TABLE 1

| Ex. No. | Weight % loading | | | Atomic % | | |
|---|---|---|---|---|---|---|
| | Pd | Ru | Pt | Pd | Ru | Pt |
| 1 | 25 | 25 | — | 47.9 | 52.1 | — |
| 2 | 23.5 | 23.5 | 4.5 | 46.3 | 48.9 | 4.8 |
| 3 | 23.4 | 23.4 | 4.6 | 46.8 | 48.9 | 4.3 |
| 4 | 21.5 | 21.1 | — | 48.8 | 51.2 | — |
| 5 | 11.3 | 31.8 | — | 26.2 | 73.8 | — |
| 6 | 11.6 | 33.9 | 4.7 | 23.4 | 72.3 | 4.3 |
| 7 | 11.7 | 34.5 | 9.1 | 22.1 | 68.4 | 9.5 |
| Comp. Ex. 1 | 20 | — | — | 100 | — | — |
| Comp. Ex. 2 | — | 25 | — | — | 100 | — |
| Comp. Ex. 3 | — | 25 | 50 | — | 49.1 | 50.9 |

Testing in a Direct Methanol Fuel Cell

The catalysts of examples 1 to 7 and the three comparative examples were used to prepare membrane electrode assemblies. The catalysts were formulated into inks using the techniques outlined in EP 0 731 520 and used to prepare anode electrocatalyst layers. The catalyst loadings on the anodes are given in Table 2. The cathode electrocatalyst layers contained standard Pt on carbon electrocatalysts.

TABLE 2

| Example No. | Alloy Loading/mgcm$^{-2}$ | Platinum Loading/mgcm$^{-2}$ |
|---|---|---|
| 1 | 2.0 | 0 |
| 2 | 1.5 | 0.14 |
| 3 | 1.5 | 0.14 |
| 4 | 1.5 | 0 |
| 5 | 1.5 | 0 |
| 6 | 1.5 | 0.14 |
| 7 | 1.5 | 0.25 |
| Comp. Ex. 1 | 0.5 | 0 |
| Comp. Ex. 2 | 0.5 | 0 |
| Comp. Ex. 3 | 1.5 | 1.0 |

The membrane electrode assemblies were tested in a direct methanol test cell.

FIG. 1 shows the performance of membrane electrode assemblies containing electro catalysts of the invention and comparative examples 1 and 2 at 80° C. The performance of the MEAs containing electrocatalysts of the invention are considerably better than the performance of the MEAs containing Pd only and Ru only catalysts.

Figure 2:
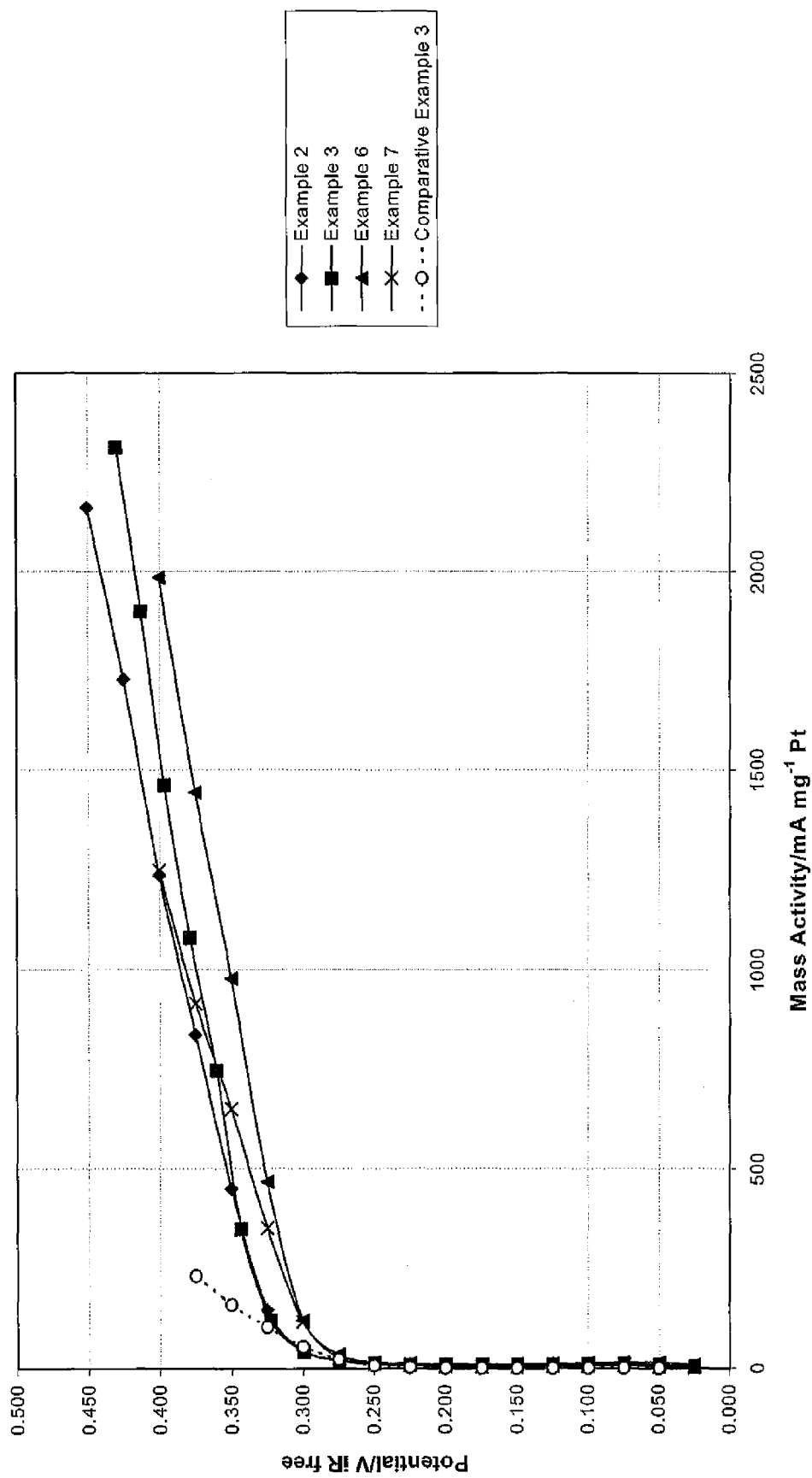
FIG. 2 shows the performance of membrane electrode assemblies containing electrocatalysts according to embodiments of the invention and comparative example 3 at 80° C.

FIG. 2 shows the performance of membrane electrode assemblies containing electrocatalysts of the invention and comparative example 3 at 80° C. The performance is given as the mass activity, i.e. the activity per mg of Pt on the electrode. Although the MEAs containing electrocatalysts of the invention have a considerably lower platinum loading (see table 2), the activity per mg of Pt is improved over the comparative example. Thus it is possible to prepare electrocatalysts having a high performance but with lower platinum loadings and therefore at a lower cost.

The invention claimed is:

1. An electrocatalyst comprising an alloy having a single crystalline phase, wherein the alloy consists of 5-95 at % palladium, 5-95 at % ruthenium and, optionally, platinum having less than 10 at % platinum, provided that the alloy does not consist of 50 at % palladium and 50 at % ruthenium.

2. An electrocatalyst according to claim 1, wherein the amount of palladium in the alloy is at least 20 at %.

3. An electrocatalyst according to claim 1, wherein the amount of ruthenium in the alloy is at least 20 at %.

4. An electrocatalyst according to claim 1, wherein the amount of platinum in the alloy is up to 5 at %.

5. An electrocatalyst according to claim 1, wherein the amount of palladium in the alloy is from 5 to 49 at %, the amount of ruthenium in the alloy is from 51 to 95 at %, and the amount of platinum is up to 10 at %.

6. An electrocatalyst according to claim 1, wherein when the amount of palladium in the alloy is less than 30 at %, the amount of platinum in the alloy is greater than 0 at %.

7. An electrocatalyst according to claim 1, wherein the electrocatalyst consists of the alloy.

8. An electrocatalyst according to claim 1, wherein the electrocatalyst comprises the alloy supported on a high surface area support material.

9. A method for preparing an electrocatalyst according to claim 1 comprising the steps of:
  (a) preparing a solution comprising a palladium salt, a ruthenium salt and optionally a salts of platinum;
  (b) co-precipitating the metals, optionally in the presence of a high-surface area support material, by adjusting the pH;
  (c) filtering;
  (d) drying; and
  (e) firing in a reducing atmosphere.

10. A method for preparing an electrocatalyst according to claim 9, wherein the co-precipitating step occurs in the presence of a high surface area support material.

11. A catalyst ink comprising an electrocatalyst according to claim 1 dispersed in a solvent and further comprising a proton-conducting polymer.

12. A catalysed gas diffusion electrode comprising a gas diffusion material and an electrocatalyst layer deposited on the gas diffusion material, wherein the electrocatalyst layer comprises an electrocatalyst according to claim 1.

13. A catalysed membrane comprising a proton exchange membrane and an electrocatalyst layer deposited on the membrane, wherein the electrocatalyst layer comprises an electrocatalyst according to claim 1.

14. A membrane electrode assembly comprising an electrocatalyst according to claim 1.

15. A fuel cell wherein the anode comprises an electrocatalyst according to claim 1.

16. A direct methanol fuel cell wherein the anode comprises an electrocatalyst according to claim 1.

* * * * *